US012656159B2

(12) United States Patent
Wahlin et al.

(10) Patent No.: US 12,656,159 B2
(45) Date of Patent: Jun. 16, 2026

(54) AIRCRAFT FUEL QUANTITY INDICATION SYSTEM AND METHOD

(71) Applicant: The Boeing Company, Arlington, VA (US)

(72) Inventors: Sigvard Johann Wahlin, Bothell, WA (US); Andrew Frederick Douglass, Issaquah, WA (US)

(73) Assignee: THE BOEING COMPANY, Arlington, VA (US)

( * ) Notice: Subject to any disclaimer, the term of this patent is extended or adjusted under 35 U.S.C. 154(b) by 245 days.

(21) Appl. No.: 18/496,119

(22) Filed: Oct. 27, 2023

(65) Prior Publication Data

US 2025/0137826 A1    May 1, 2025

(51) Int. Cl.
*G01F 9/00*    (2006.01)
*B64F 1/28*    (2006.01)
*B64F 5/60*    (2017.01)

(52) U.S. Cl.
CPC .................. *G01F 9/00* (2013.01); *B64F 1/28* (2013.01); *B64F 5/60* (2017.01)

(58) Field of Classification Search
None
See application file for complete search history.

(56) References Cited

U.S. PATENT DOCUMENTS

| | | | | |
|---|---|---|---|---|
| 6,234,224 | B1 * | 5/2001 | Schultz, Jr. .............. | B67D 7/42 |
| | | | | 141/95 |
| 9,045,238 | B2 * | 6/2015 | Lohmann .................. | B64F 1/28 |
| 2006/0237591 | A1 * | 10/2006 | McCoskey .............. | B64C 25/42 |
| | | | | 244/135 R |
| 2012/0043425 | A1 | 2/2012 | Beck | |
| 2020/0399001 | A1 | 12/2020 | Beck | |
| 2023/0324319 | A1 | 10/2023 | Bemment et al. | |

FOREIGN PATENT DOCUMENTS

| | | | | | |
|---|---|---|---|---|---|
| EP | 3702287 | A1 * | 9/2020 | ............. | B64D 37/16 |
| RU | 2317229 | C1 | 2/2008 | | |
| WO | WO-2009098012 | A2 * | 8/2009 | ............. | B64D 37/14 |

OTHER PUBLICATIONS

EP Search Report mailed Feb. 3, 2025 in re EP Application No. 24196245.5.

* cited by examiner

*Primary Examiner* — Peter J Macchiarolo
*Assistant Examiner* — Jermaine L Jenkins
(74) *Attorney, Agent, or Firm* — COATS & BENNETT, PLLC

(57) ABSTRACT

An aircraft fueling adapter incorporating an aircraft fueling adapter flow meter is disclosed for improving accuracy of fueling protocols by providing an additional independent flow data point in mass units and/or volume units in the fueling process that can be compared against existing fuel flow readings.

19 Claims, 12 Drawing Sheets

AIRCRAFT FUEL QUANTITY INDICATION SYSTEM AND METHOD

TECHNOLOGICAL FIELD

The present disclosure relates, generally, to the field of large vehicle fueling and re-fueling. More specifically, the present disclosure relates to the field of aircraft fueling and re-fueling from ground fuel sources.

BACKGROUND

In modern aviation, an aircraft fuel quantity and aircraft fuel consumption, over time, is typically monitored and indicated onboard an aircraft by fuel gauges that are in communication with an aircraft fuel tank, with the fuel gauges located within a cockpit and incorporated within and into a flight control panel, fueling panel, etc. Fuel flow measurements in aircraft, are typically registered in mass units, as the calorific value of fuel is proportional to mass, and not to volume.

The on-the-ground delivery of aircraft fuel into aircraft (e.g., including "re-fueling", etc.) can routinely involve such fuel delivery to an aircraft from an aircraft fuel source that can be, for example, a fueling or re-fueling truck tanker, and/or that can be an underground or above ground fuel storage tank, etc. Typically, aircraft fuel contained within tank trucks or on-ground storage tanks is delivered into an aircraft and into aircraft fuel tanks with fuel delivery measurement taken at the fuel delivery source, and with the amount of delivered aircraft fuel delivered from the source to the aircraft measured in terms of volume (e.g., using volumetric units). Flight regulations typically require that delivered fuel values must be checked by the fuel delivery ground crew, and then, once a daily fuel density value (e.g., a certified fuel density value, etc.) is made available to ground personnel, the volume value is manually mathematically converted by ground personnel from volumetric units to mass units.

Unless explicitly identified as such, no statement herein is admitted as prior art merely by its inclusion in the Technological Field and/or Background section.

SUMMARY

A present aspect is directed to an aircraft fueling adapter, with the aircraft fueling adapter including an aircraft fueling adapter body, with the aircraft fueling adapter body further including an aircraft fueling adapter exterior and an aircraft fueling adapter body interior, with the aircraft fueling adapter interior further including an aircraft fueling adapter interior wall and an aircraft fueling adapter interior pathway, and with the aircraft fueling adapter interior pathway substantially defined by the aircraft fueling adapter interior wall. The aircraft fueling adapter further includes an aircraft fueling adapter interior pathway inlet, an aircraft fueling adapter interior pathway outlet, and an aircraft fueling adapter flow meter, with the aircraft fueling adapter flow meter in communication with the aircraft fueling adapter interior pathway of the aircraft fueling adapter body.

In another present aspect, the aircraft fueling adapter flow meter is configured to send a signal representing a first determined fuel value to an aircraft fueling adapter flow meter readout.

In another present aspect, the aircraft fueling adapter flow meter is a mass flow meter.

In another present aspect, the aircraft fueling adapter flow meter is configured to determine the volume of a fuel flow through the aircraft fueling adapter flow meter.

Another present aspect is directed to an aircraft structure including an aircraft fueling adapter, with the aircraft fueling adapter including an aircraft fueling adapter body, with the aircraft fueling adapter body further including an aircraft fueling adapter exterior and an aircraft fueling adapter body interior, with the aircraft fueling adapter interior including an aircraft fueling adapter interior wall and an aircraft fueling adapter interior pathway, and with the aircraft fueling adapter interior pathway substantially defined by the aircraft fueling adapter interior wall. The aircraft fueling adapter further includes an aircraft fueling adapter interior pathway inlet, an aircraft fueling adapter interior pathway outlet, and an aircraft fueling adapter flow meter, with the aircraft fueling adapter flow meter in communication with the aircraft fueling adapter interior pathway of the aircraft fueling adapter body.

Another present aspect is directed to an aircraft including an aircraft fueling adapter, with the aircraft fueling adapter including an aircraft fueling adapter body, with the aircraft fueling adapter body further including an aircraft fueling adapter exterior and an aircraft fueling adapter body interior, with the aircraft fueling adapter interior including an aircraft fueling adapter interior wall and an aircraft fueling adapter interior pathway, and with the aircraft fueling adapter interior pathway substantially defined by the aircraft fueling adapter interior wall. The aircraft fueling adapter further includes an aircraft fueling adapter interior pathway inlet, an aircraft fueling adapter interior pathway outlet, and an aircraft fueling adapter flow meter, with the aircraft fueling adapter flow meter in communication with the aircraft fueling adapter interior pathway of the aircraft fueling adapter body.

Another present aspect is directed to method for confirming an accurate delivery of an amount of fuel delivered from a fuel supply into an aircraft fuel tank, with the method including engaging an aircraft fueling adapter with a fuel supply assembly, with the aircraft fueling adapter fixedly engaged with an aircraft structure, and with the aircraft structure comprising an aircraft fuel inlet. The aircraft fueling adapter includes an aircraft fueling adapter body, with the aircraft fueling adapter body further including an aircraft fueling adapter exterior and an aircraft fueling adapter body interior. The aircraft fueling adapter interior includes an aircraft fueling adapter interior wall and an aircraft fueling adapter interior pathway, with the aircraft fueling adapter interior pathway substantially defined by the aircraft fueling adapter interior wall. The aircraft fueling adapter further includes an aircraft fueling adapter interior pathway inlet, an aircraft fueling adapter interior pathway outlet, and an aircraft fueling adapter flow meter, with the aircraft fueling adapter flow meter in communication with the aircraft fueling adapter interior pathway, and with the aircraft fueling adapter flow meter configured to determine an amount of fuel flow amount passing the aircraft fueling adapter mass flow meter, with the amount of fuel flow traversing a path from a fuel supply to the aircraft fueling adapter and into an aircraft fuel tank. The method further includes directing a flow of fuel (e.g., a "fuel flow") from the fuel supply to the aircraft fueling adapter, directing fuel flow from the aircraft fueling adapter into an aircraft fuel tank, and determining at the aircraft fueling adapter an amount of fuel delivered from the fuel supply into the aircraft fuel tank through the aircraft fueling adapter. A present method further includes determining a first determined fuel value at the aircraft fueling adapter by the integrated aircraft fueling adapter flow meter to confirm the accurate delivery of the amount of fuel flow fuel delivered from the fuel supply into the aircraft fuel tank.

Another present aspect is directed to a method for confirming an accurate delivery of an amount of fuel delivered from a fuel supply into an aircraft fuel tank, with the method including engaging an aircraft fueling adapter with a fuel supply assembly, with the aircraft fueling adapter fixedly engaged with an aircraft structure, and with the aircraft structure comprising an aircraft fuel inlet. The aircraft fueling adapter includes an aircraft fueling adapter body, with the aircraft fueling adapter body further including an aircraft fueling adapter exterior and an aircraft fueling adapter body interior. The aircraft fueling adapter interior includes an aircraft fueling adapter interior wall and an aircraft fueling adapter interior pathway, with the aircraft fueling adapter interior pathway substantially defined by the aircraft fueling adapter interior wall. The aircraft fueling adapter further includes an aircraft fueling adapter interior pathway inlet, an aircraft fueling adapter interior pathway outlet, and an aircraft fueling adapter flow meter, with the aircraft fueling adapter flow meter in communication with the aircraft fueling adapter interior pathway, and with the aircraft fueling adapter flow meter configured to determine an amount of fuel flow amount passing the aircraft fueling adapter mass flow meter, with the amount of fuel flow traversing a path from a fuel supply to the aircraft fueling adapter and into an aircraft fuel tank. The method further includes directing a flow of fuel from the fuel supply to the aircraft fueling adapter, directing fuel flow from the aircraft fueling adapter into an aircraft fuel tank, and determining at the aircraft fueling adapter an amount of fuel delivered from the fuel supply into the aircraft fuel tank through the aircraft fueling adapter. A present method further includes determining a first determined fuel value at the aircraft fueling adapter to confirm the accurate delivery of the amount of fuel flow fuel delivered from the fuel supply into the aircraft fuel tank, determining a second determined fuel value measured at, at least one of the fuel supply readout and the aircraft fuel gauge readout for the amount of fuel delivered from the fuel supply to the aircraft fuel tank, and comparing the first determined fuel value to the second determined fuel value to confirm agreement between, or to determine the presence of a discrepancy between, the first determined fuel value and the second determined fuel value.

In another present aspect, the aircraft fueling adapter flow meter is a mass flow meter configured to directly calculate fuel mass delivered to the aircraft fuel tank from the aircraft fuel supply, and wherein said first determined fuel value determined at the aircraft fueling adapter is a mass value (e.g., a fuel quantity value in mass units such as kgs., lbs., etc.).

In another present aspect, the second determined fuel value is a converted mass value calculated at the fuel supply, with the converted mass value converted from a determined fuel quantity volume value (e.g., in volume units such as liters, gallons, etc.).

In another present aspect, the aircraft fueling adapter flow meter is configured to measure fuel flow volume delivered to the aircraft fuel tank from the aircraft fuel supply, and wherein the first determined fuel value is a volumetric value in volume units.

In another aspect, the second determined fuel value is a volumetric value calculated at the fuel supply.

In a further present aspect, the aircraft fueling adapter flow meter is further configured to automatically calculate an amount of fuel delivered to the aircraft fuel tank from the aircraft fuel supply, and wherein the first determined fuel value is at least one of a mass value and a volumetric value.

Another present aspect is directed to a method for fueling an aircraft, with the method including providing a fuel supply, providing an aircraft fuel tank in an aircraft, with the aircraft fuel tank in communication with an aircraft fuel tank inlet. The method further includes providing an aircraft fueling adapter fixedly engaged with the aircraft, with the aircraft fueling adapter in communication with the aircraft fuel tank inlet, with the aircraft fueling adapter further in communication with the fuel supply, and with the aircraft fueling adapter comprising an aircraft fueling adapter flow meter. The method further includes delivering a fuel flow from the fuel supply to the aircraft fuel tank, determining a first determined fuel value based on a fuel flow, with the fuel flow configured to pass through the aircraft fueling adapter, and determining a first determined fuel value measured at the aircraft fueling adapter by the aircraft fueling adapter flow meter.

In another aspect, the method includes determining a second determined fuel value measured at, at least one of the fuel supply and the aircraft fuel quantity gauge readout based on a fuel flow leaving the fuel supply and entering into an aircraft.

In another present aspect, the aircraft fueling adapter flow meter is a mass flow meter configured to directly calculate fuel mass delivered to the aircraft fuel tank from the aircraft fuel supply, and wherein the first determined fuel value is a mass value.

In another present aspect, the second determined fuel value is a converted mass value calculated at the fuel supply and converted from a volumetric value into mass units.

In a further present aspect, the aircraft fueling adapter flow meter is further configured to measure fuel flow volume delivered to the aircraft fuel tank from the aircraft fuel supply, and wherein said first determined fuel value determined by value the aircraft fueling adapter flow meter at the aircraft fueling adapter is a volumetric value.

In another present aspect, the second determined fuel value is a volumetric value measured at the fuel supply.

In another present aspect, the aircraft fueling adapter flow meter is further configured to automatically (e.g., without manual conversion and/or calculation) directly calculate at least one of fuel volume and fuel mass delivered to the aircraft fuel tank from the aircraft fuel supply, and wherein the first determined fuel value is at least one of a mass value and a volumetric value.

In another aspect, the second determined fuel value is a mass value calculated manually by converting a fuel volume value delivered from the fuel supply based on the measured fuel volume delivered from the fuel supply.

Further present aspects are directed to a present method including comparing the first determined fuel value to the second determined fuel value to determine agreement between and/or a discrepancy between the first determined fuel value and the second determined fuel value.

In another aspect, the aircraft fueling adapter flow meter is configured to determine both a flow volume in volumetric units and flow mass in mass units.

In another aspect, the aircraft fueling adapter comprises a plurality of flow meters.

Another present method if directed to a method for making an aircraft fueling adapter, with the method including providing an aircraft fueling adapter including a fueling adapter body, with the aircraft fueling adapter body further including an aircraft fueling adapter exterior and an aircraft fueling adapter body interior, with the aircraft fueling adapter interior including an aircraft fueling adapter interior wall and an aircraft fueling adapter interior pathway, and with the aircraft fueling adapter interior pathway substantially defined by the aircraft fueling adapter interior wall. The method further includes incorporating a flow meter into the aircraft fueling adapter, with the flow meter in communication with the aircraft fueling adapter interior pathway, with the flow meter configured to determine an amount of a fuel flow passing the aircraft flow meter, and with the amount of the fuel flow configured to traverse a path from a fuel supply through the aircraft fueling adapter and into an aircraft fuel tank.

In another aspect, the flow meter is configured to send a flow value signal to a readout.

In another aspect, the aircraft fueling adapter comprises the readout.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
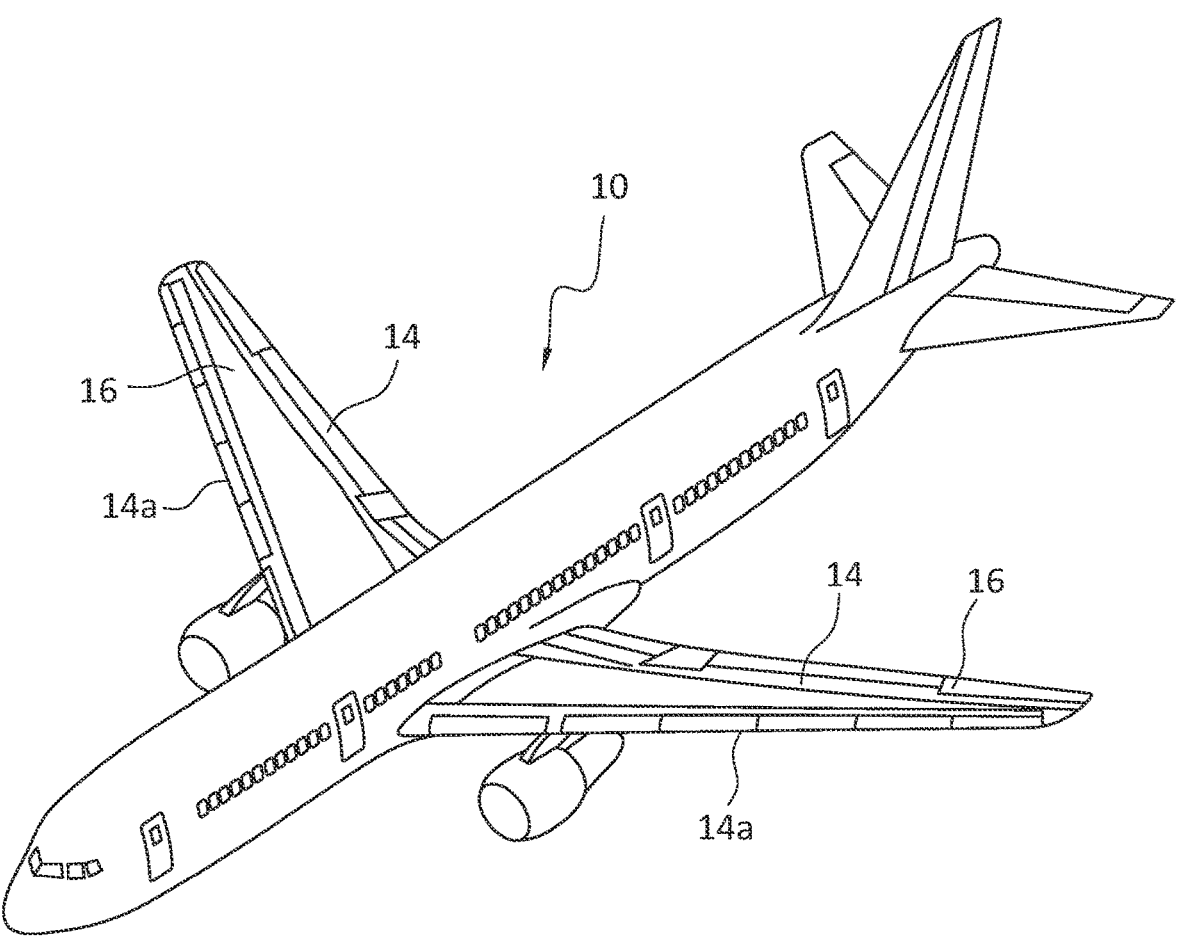
Figure 2:
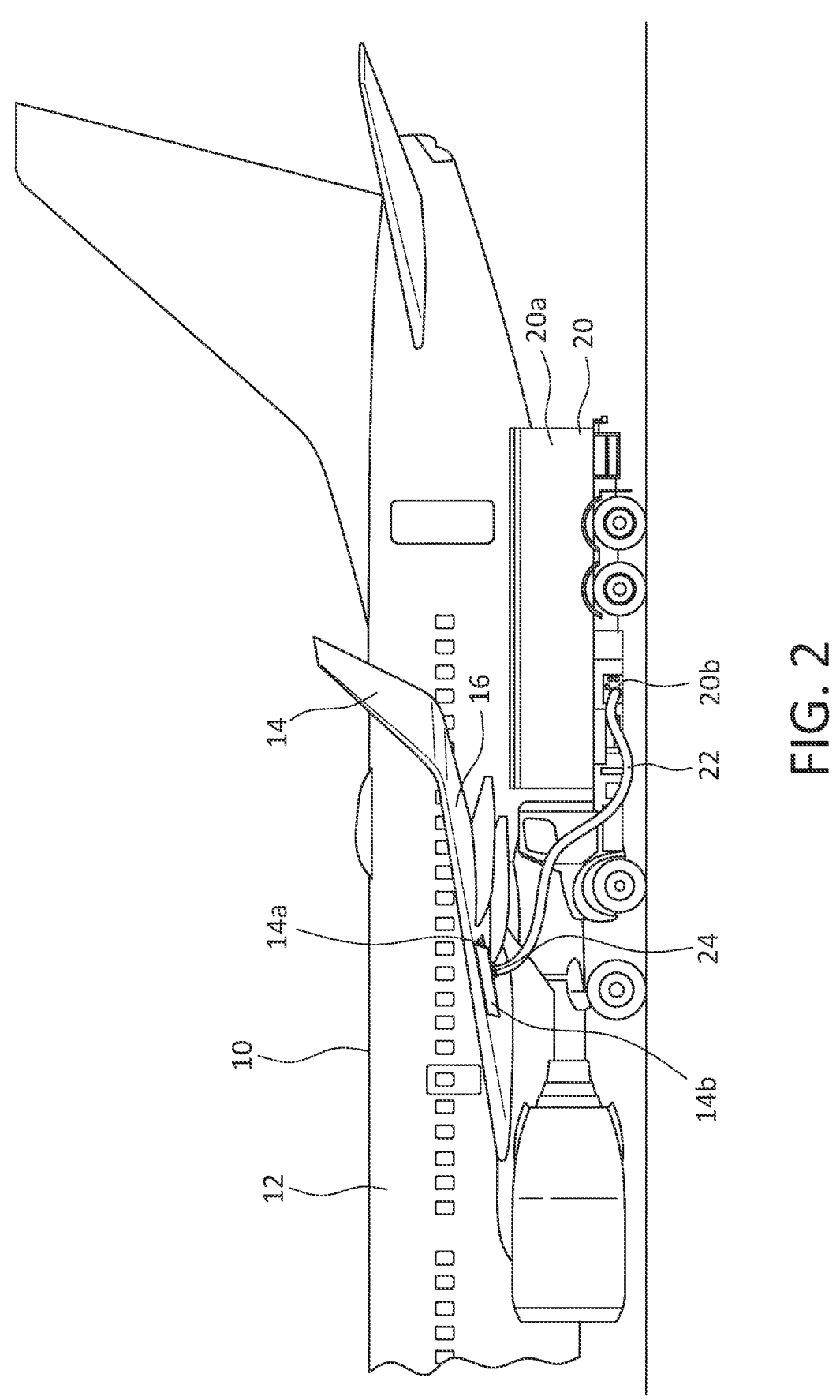
Figures 3, 3A, 4:
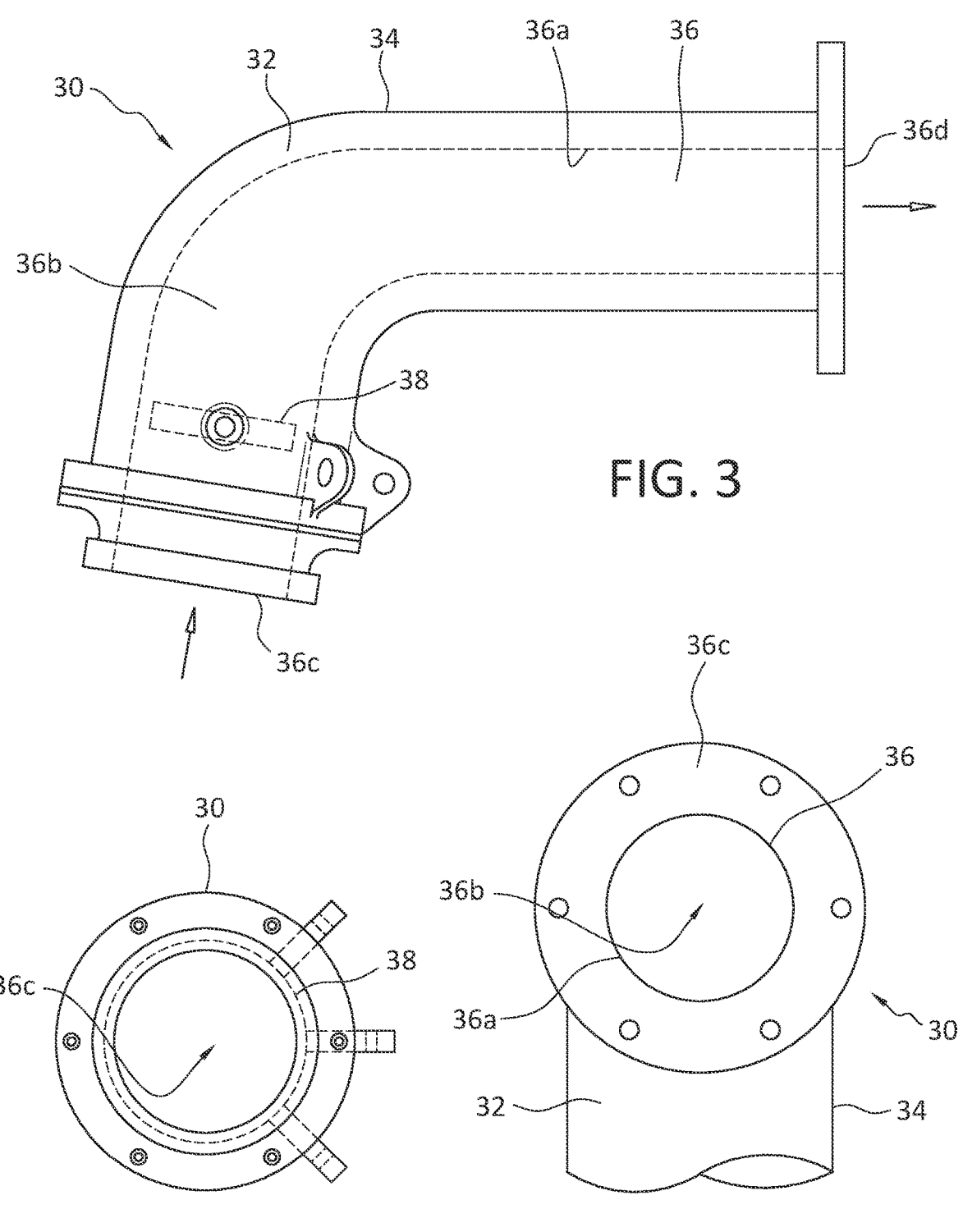
Figure 5:
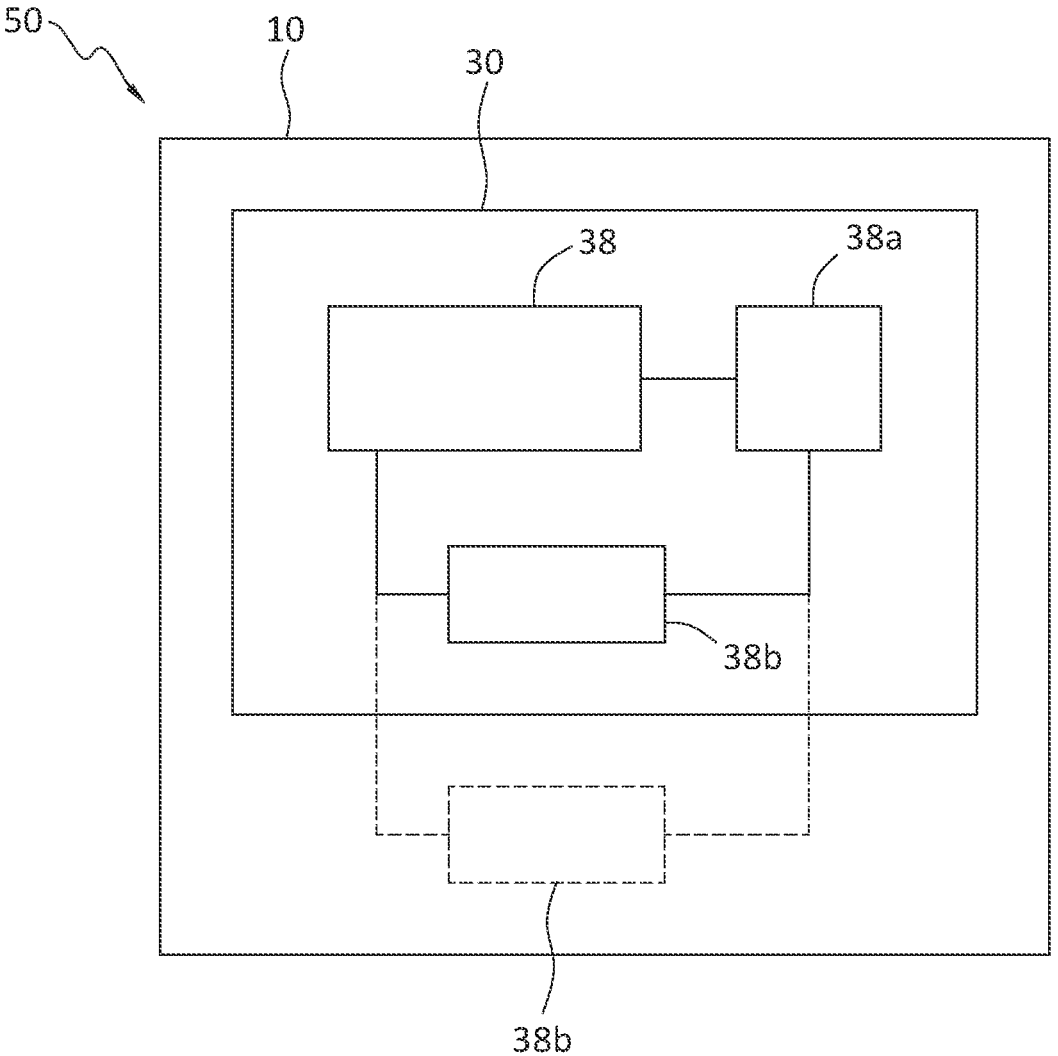
Figure 6:
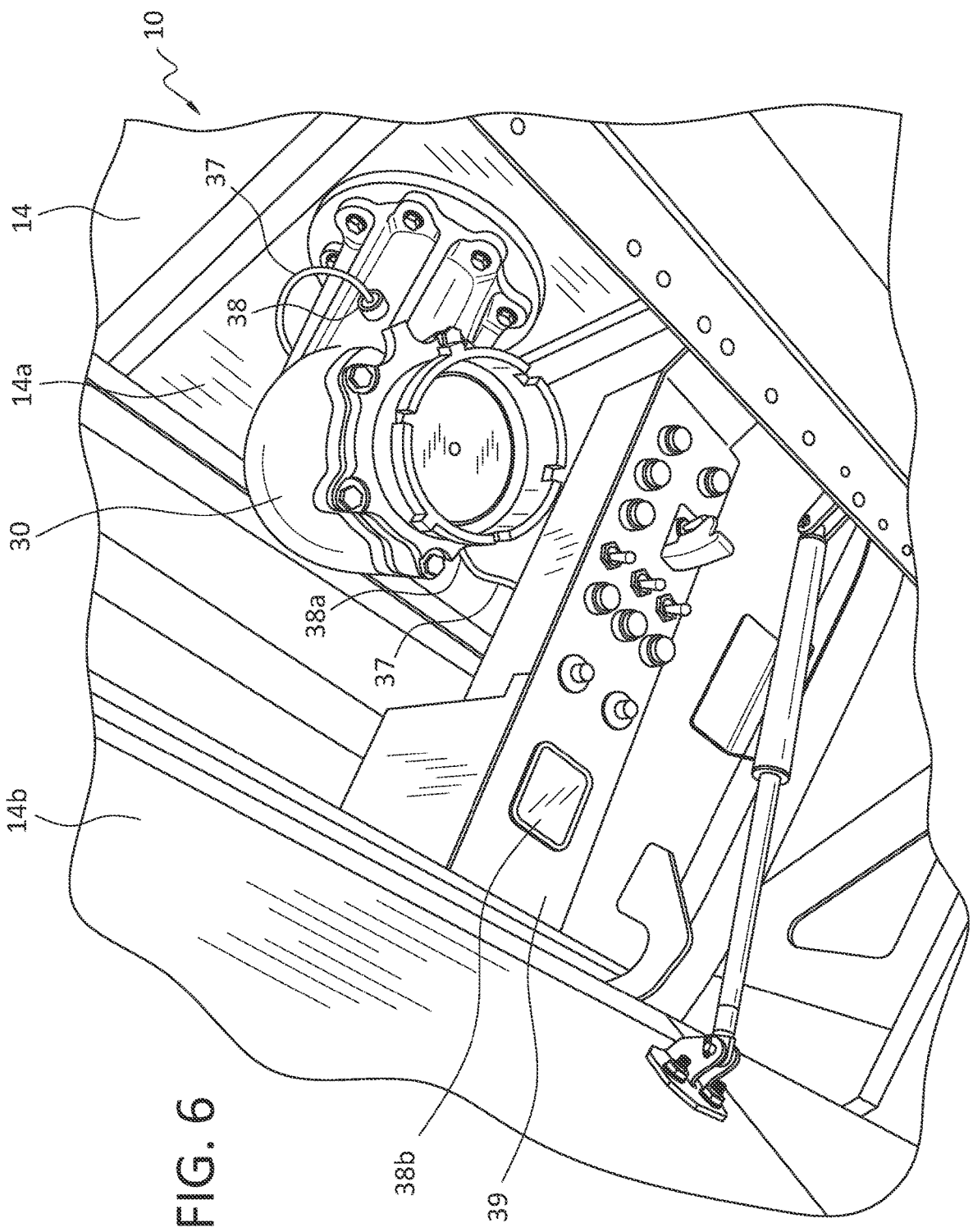
Figure 7:
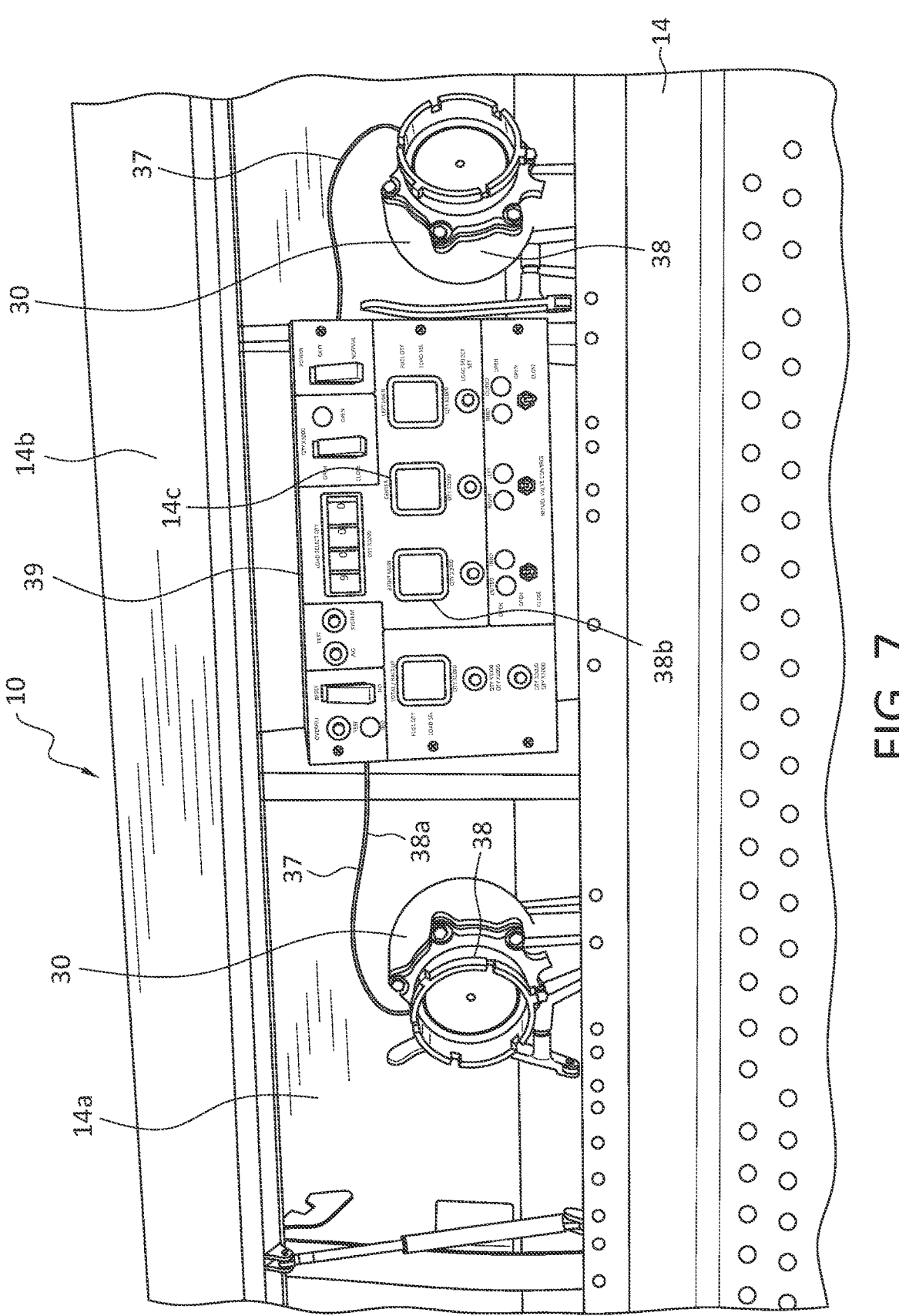
Figure 8:
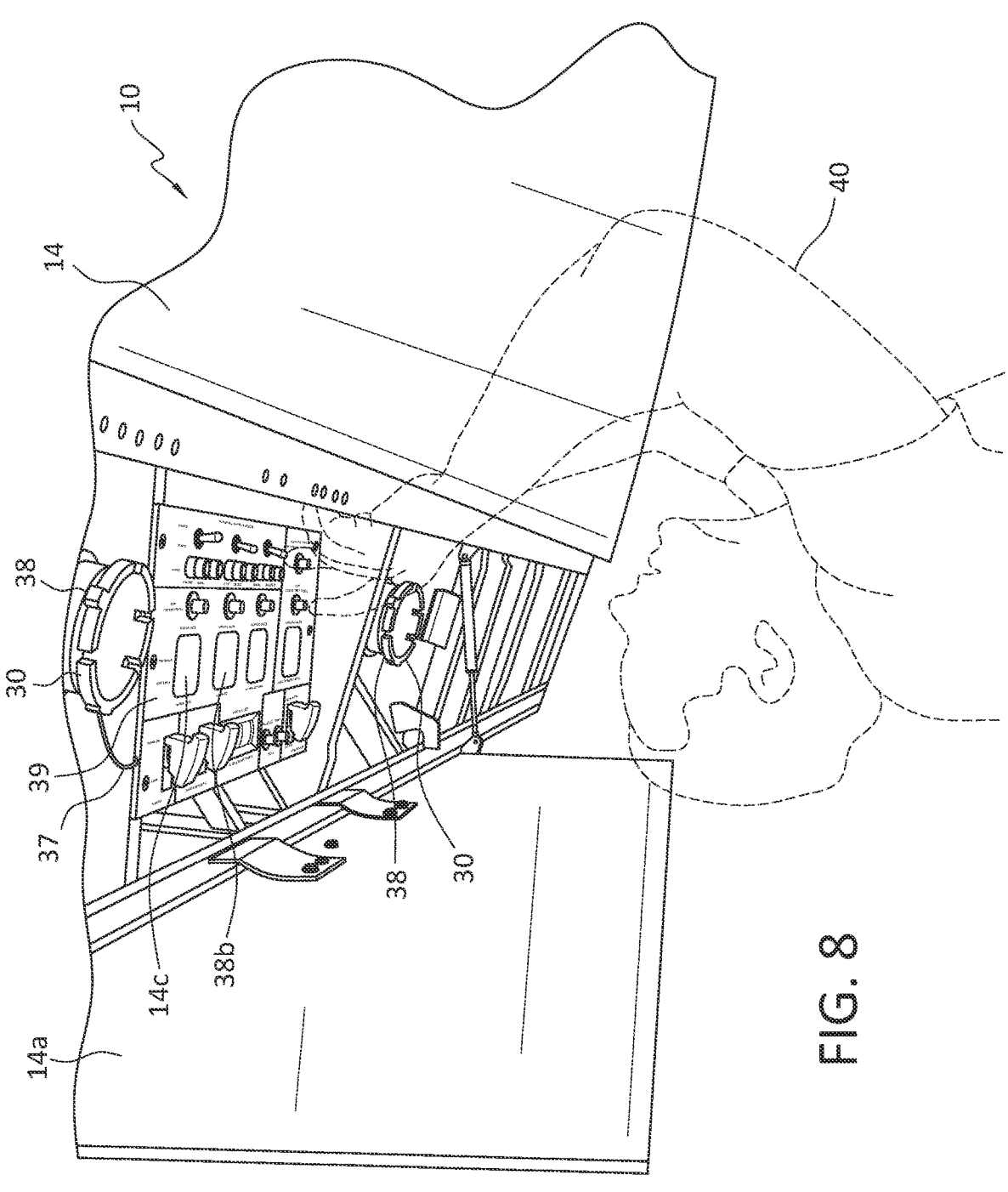
Figure 9:
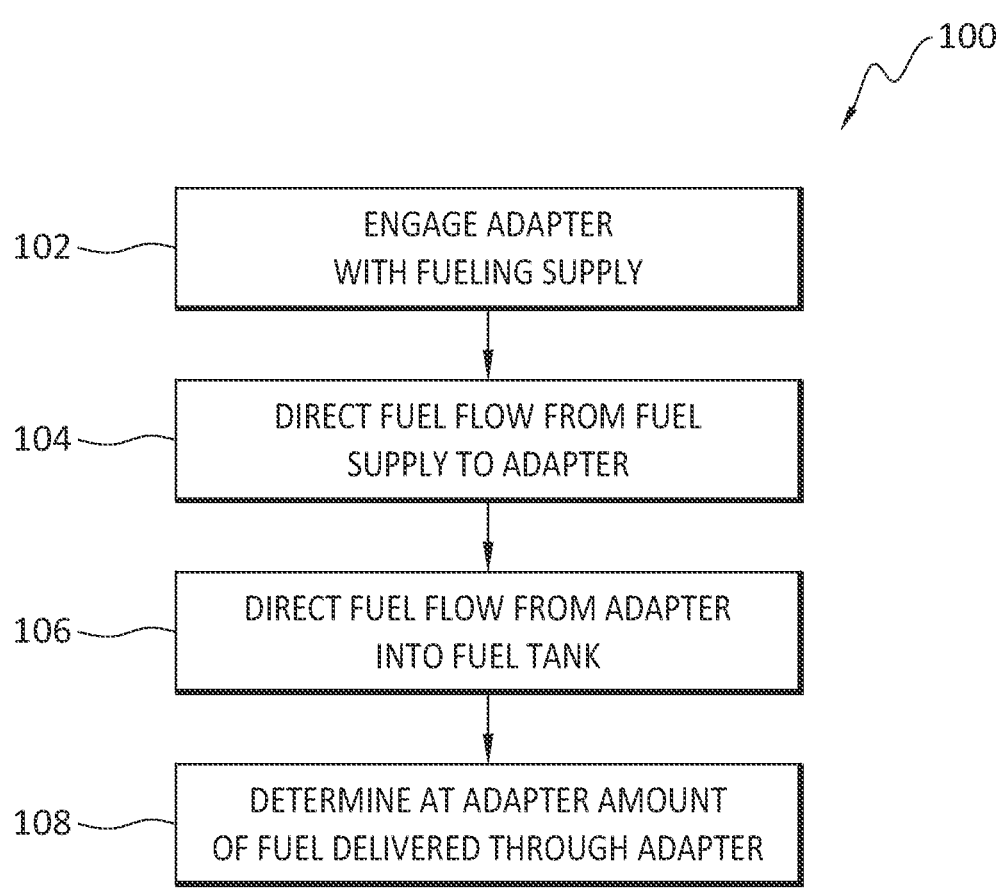
Figure 10:
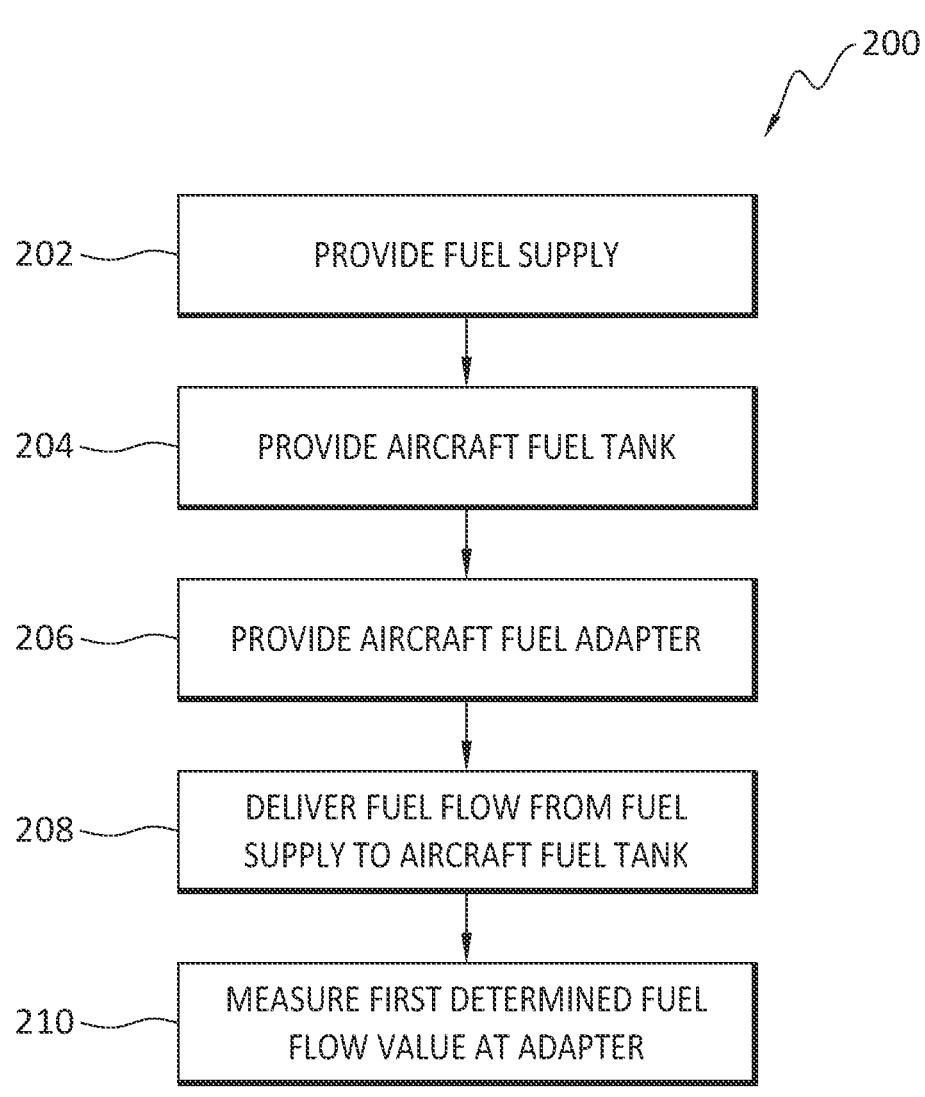
Figure 11:
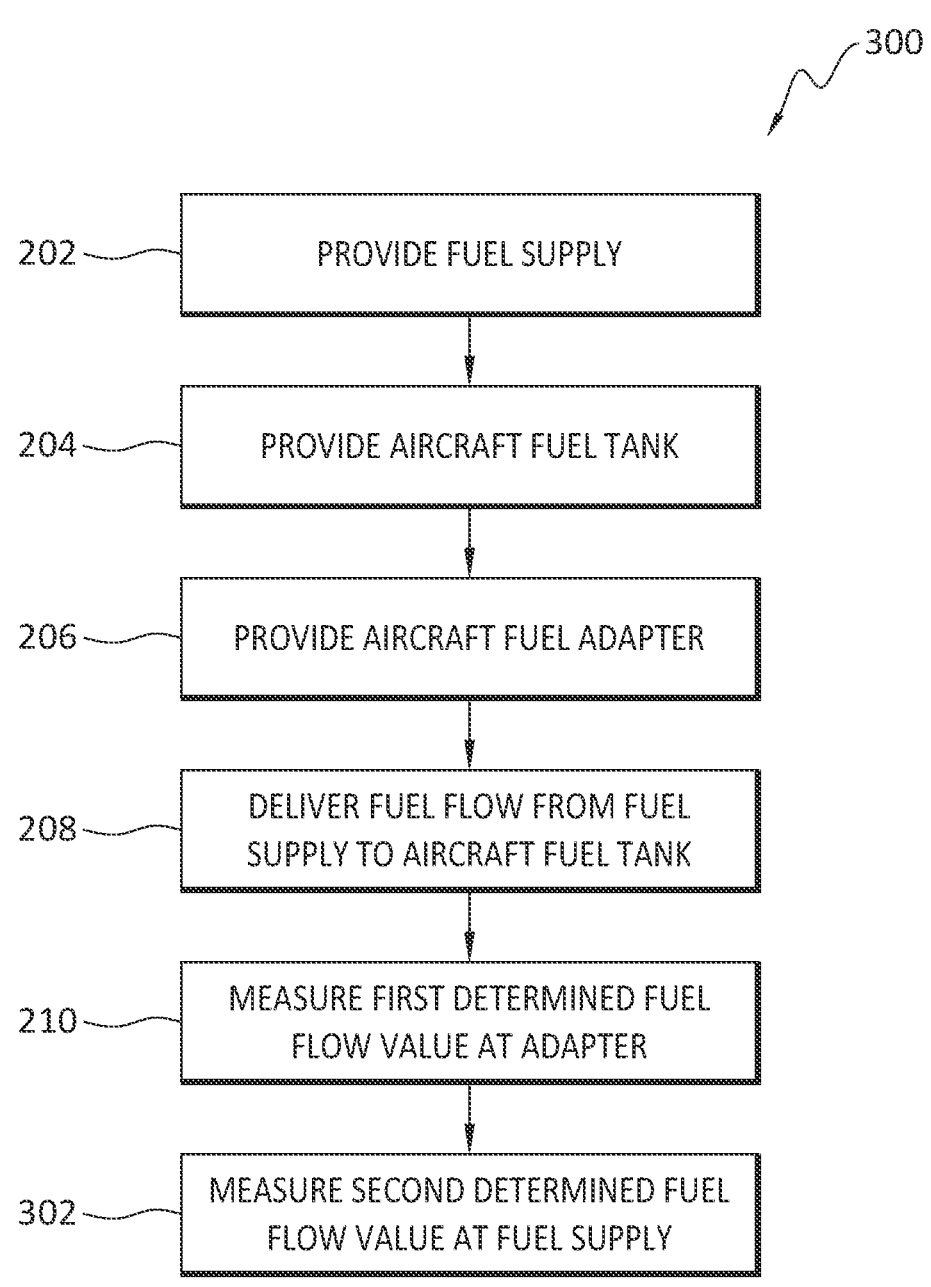
Figure 12:
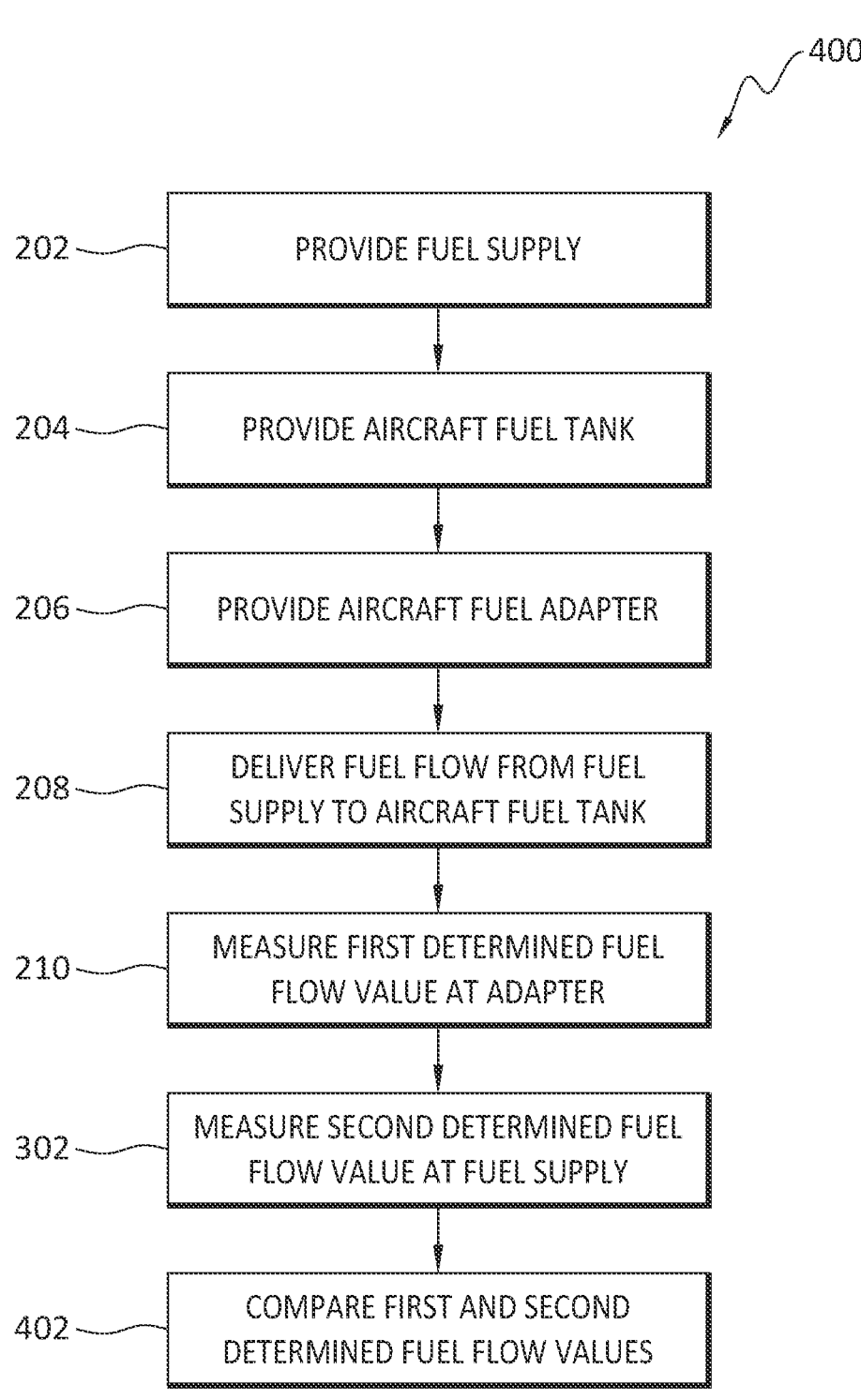

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is an illustration of a vehicle in the form of an aircraft being fueled, according to present aspects;

FIG. 3 is a view into an aircraft fueling adapter body interior pathway inlet, according to present aspects;

FIG. 3A is a view into an aircraft fueling adapter body interior pathway inlet, according to present aspects;

FIG. 4 is an overhead view of a flow meter, according to present aspects;

FIG. 5 is box diagram of an aircraft fueling adapter, according to present aspects;

FIG. 6 is an illustration of an exposed aircraft wing fuel panel, according to present aspects;

FIG. 7 is an illustration of an exposed aircraft wing fuel panel, according to present aspects;

FIG. 8 is a perspective view of an exposed aircraft wing fuel panel, according to present aspects;

FIG. 9 is a flowchart outlining a method, according to present aspects;

FIG. 10 is a flowchart outlining a method, according to present aspects;

FIG. 11 is a flowchart outlining a method, according to present aspects;

FIG. 12 is a flowchart outlining a method, according to present aspects; and

Figure 13:
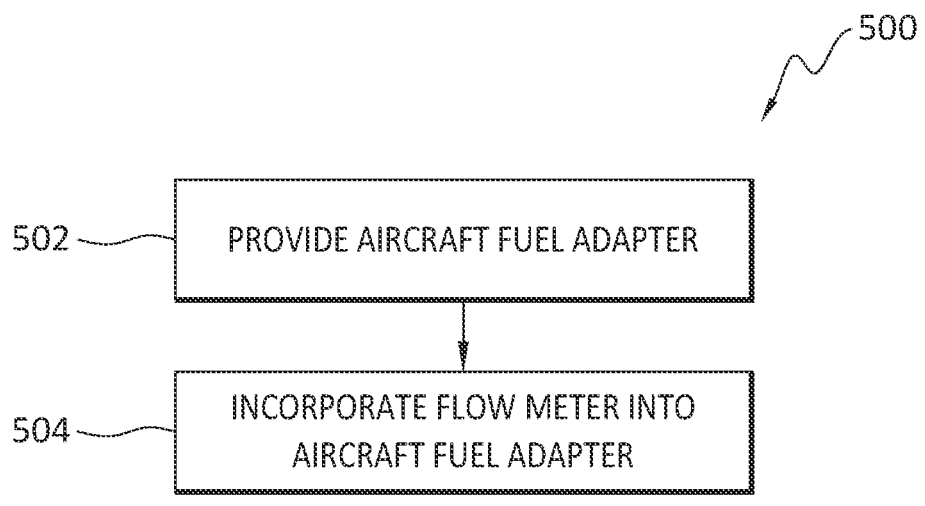

FIG. 13 is a flowchart outlining a method, according to present aspects.

DETAILED DESCRIPTION

As explained herein, fuel quantity measurements in an aircraft, are most useful when presented in mass units, as the calorific value of fuel is proportional to fuel mass, and not fuel volume. The processes at aircraft on-the-ground refueling typically involve delivery of fuel to aircraft from fuel tank sources that are measured in terms of volume. To satisfy regulations, fuel delivery calculations and conversions are typically conducted manually; with on-the-ground fueling personnel given a fuel density value that is then entered in the calculation to convert delivered volume from a fueling source into delivered fuel mass. The fuel volume reading or "value" that is then converted to a mass value via human calculation, can introduce an opportunity for inaccuracy, as a manual calculation can introduce "human error" into the converted value of mass from volume, etc.

That is, currently, refueling ground crew typically have but two datapoints to compare in the pursuit of obtaining correct and confirmatory fuel transfer values from fuel delivered from a fueling source/supply into an aircraft. First, ground crew can obtain fueling data (e.g., a fuel "reading") from an aircraft fuel gauge. Second, ground crew can obtain fueling data from a fuel meter located on refuel ground equipment (e.g., a fuel truck tank and/or a fuel hydrant from an in-ground or above-ground fuel supply). The hydrant and/or truck tank meter measures fuel flow volumetrically, rendering a delivered fuel amount in volume units. The aircraft fuel gauge indicates a fuel quantity delivered to the aircraft in mass units. After a daily fuel density value is delivered to or accessed by ground fueling personnel, a mathematical calculation is conducted manually to convert volume units to mass, and the mass units are compared for agreement, and the fueling check is completed.

Present aspects recognize that errors and/or discrepancies in refueling (e.g., between a ground fuel supply source referred to equivalently herein as "ground fueling equipment", and, for example, an aircraft fuel gauging system, etc.) can go undetected by the refuel discrepancy checks that are conducted and that are routinely conducted manually by one or more ground personnel conducting such discrepancy checks "by hand", including human conversion via mathematical operation. Errors in discrepancy refuel checks can interject a gross error in actual fuel amounts onboarded to an aircraft, and can result in a fuel value that incorrectly indicates the actual amount of onboarded fuel. Inaccuracy in actual onboarded fuel value can result in overweight aircraft takeoffs (e.g., an "underestimated" amount of onboarded fuel) and can further result in insufficient mission fuel available (e.g., an "overestimated" amount of onboarded fuel). Even if an inaccurate fuel value discrepancy is corrected upon recalculation, such human error interjected into a fueling protocol can cause departure delay until such discrepancy is rectified, adding potential operation cost and system complexity prior to takeoff, etc.

Present aspects are directed to introducing significantly increased certainty, significantly increased accuracy, and significantly increased simplicity into aircraft fueling and re-fueling procedures by providing a third metering device into the fueling system that can offer a second direct measure mass flow of fuel delivered into an aircraft from a fuel source external to the aircraft that can be, for example, a tanker truck, or an underground or above ground fuel tank that is connected to an aircraft for fueling the aircraft.

FIG. 1 shows a perspective view of a vehicle in the form of an aircraft 10 comprising a fuselage 12, and an aircraft structure in the form of wings 14 (referred to equivalently herein as "aircraft wings 14"), with wings 14 each comprising at least one aircraft wing fuel panel 14a. The wings 14 further comprise an aircraft fuel tank 16 that can be an internal aircraft fuel tank.

FIG. 2 shows a view of aircraft 10 in a fueling/refueling position on the ground. As shown in FIG. 2, aircraft fuel tank 16 is in communication with a fuel supply 20 shown in the form of a fuel truck having a fuel tank containing fuel 20a. Fuel supply 20 is in communication with a fueling hose 22 having a fueling hose connection 24 that connects fueling hose 22 to an aircraft fueling adapter (not shown in FIG. 1) that is located within aircraft wing fuel panel 14*a* of aircraft wing 14 of aircraft 10. The aircraft fueling adapter serves as the fuel inlet to, and is otherwise in communication with the aircraft fuel tank. While FIG. 2 shows the fuel supply 20 in the form of a fuel tanker truck, according to present aspects, the fuel supply can be an in-ground (e.g., below ground) or above-ground fuel supply that can be in the form of a fuel tank configured to dispense fuel.

FIGS. 3, 3A, and 4 show views of an aircraft fueling adapter 30, that is located at the terminus of a fueling line located within aircraft wing 14 of an aircraft that can be the type of aircraft 10 shown in FIGS. 1, 2, for example. The aircraft fueling adapter 30 is fixedly attached to an aircraft wing 14, and is accessible via an aircraft wing fuel panel 14*a* when the aircraft fuel panel door 14*b* is opened for fueling (referred to equivalently herein as "refueling").

FIG. 3 is a partial cross-sectional side view of aircraft fueling adapter 30. As shown in FIG. 3, aircraft fueling adapter 30 comprises an aircraft fueling adapter body 32 having an aircraft fueling adapter body exterior 34 and an aircraft fueling adapter body interior 36 comprising an aircraft fueling adapter body interior wall 36*a* and an aircraft fueling adapter body interior pathway 36*b* substantially bounded by the aircraft fueling adapter body interior wall 36*a*. Aircraft fueling adapter body 32 further comprises an aircraft fueling adapter body interior pathway inlet 36*c* and an aircraft fueling adapter body interior pathway outlet 36*d* (located distally from the aircraft fueling adapter body interior pathway inlet 36*c*). Aircraft fueling adapter 30 further comprises aircraft fueling adapter flow meter 38 integrated into aircraft fueling adapter 30, with aircraft fueling adapter flow meter 38 located in position within the aircraft fueling adapter 30 that is adjacent to and otherwise in communication with aircraft fueling adapter body interior pathway 36*b*.

Aircraft fueling adapter flow meter 38 (referred to equivalently herein as "flow meter 38" and/or "adapter flow meter 38") is integrated into (referred to equivalently as "incorporated into", and/or "integral with") aircraft fueling adapter 30. The aircraft fueling adapter flow meter 38 is configured to register, sense, and accurately measure a flow of fuel (equivalently referred to herein as a "fuel flow") that is introduced into the aircraft fuel tank 16 via the aircraft fueling adapter 30. According to a present aspect, the aircraft fueling adapter flow meter 38 can be a mass flow meter that is configured to directly (without requiring a conversion to a mass value) and automatically measure the mass of the fuel flow past the aircraft fueling adapter flow meter 38 in mass units.

According to present aspects, the introduction and incorporation of a aircraft fueling adapter flow meter 38 into the aircraft fueling adapter 30 significantly increases the accuracy of comparative aircraft fuel check protocols by, at least, providing a third metering source capable of sensing and recording a fuel-loading value, and according to one present aspect, by directly measuring mass flow to equivalently compare a fuel mass value obtained by aircraft fueling adapter flow meter 38 against an existing aircraft fuel quantity gauge that also measures mass of fuel introduced into the aircraft during fueling/refueling on the ground.

The ability of the aircraft fueling adapter to directly measure mass of a fuel flow via the incorporated aircraft fueling adapter mass flow meter removes the potential for calculation error (e.g., human ground crew fueling operator error) during, for example, the manual mathematical conversion of a fuel volume value established at the fueling source into a fuel mass value.

According to present aspects, the accuracy of the aircraft fueling process is significantly enhanced by providing a third overall fueling value during and at the conclusion of the fueling process, and a second fueling value on the aircraft (that are distinct from the volumetric fueling value rendered by the fueling source). Returning to FIG. 2, the fuel supply 20 (shown in FIG. 2 in the form of a fuel tanker truck) containing an amount of fuel 20*a* to be disbursed and/or delivered to the aircraft from the fuel supply 20 (referred to equivalently herein as the "fuel source 20") into the aircraft 10 further comprises a fueling readout 20*b* that can be a gauge configured to indicate a volumetric amount of fuel delivered from the fuel source; with such volumetric amount registered in volume units.

FIG. 3A is a view into the aircraft fueling adapter 30 showing aircraft fueling adapter body 32 comprising the aircraft fueling adapter body exterior 34 and aircraft fueling adapter body interior 36 comprising aircraft fueling adapter body interior wall 36*a*, aircraft fueling adapter body interior pathway 36*b* (bounded by aircraft fueling adapter body interior wall 36*a*), and aircraft fueling adapter body interior pathway inlet 36*c*.

FIG. 4 is a representative view of an aircraft fueling adapter flow meter 38 incorporated into the aircraft fueling adapter 30. The type of aircraft fueling adapter flow meter 38 incorporated into the aircraft fuel adapter 30 can be a device that measures a fluid flow that is delivered past the flow meter; with the flow meter configured to assess and otherwise accurately and precisely measure the flow in volumetric and/or in mass units directly.

In addition, according to another present example, the type of aircraft fueling adapter flow meter 38 incorporated into the aircraft fuel adapter 30 can be a device that measures a flow that is delivered past the aircraft fueling adapter flow meter; with the aircraft fueling adapter flow meter configured to assess and otherwise accurately and precisely measure the flow in volumetric units or in mass units, with the flow meter in communication with a processor, hardware, software, etc., such that the determined flow value can be converted automatically, with one value (mass or volume) being directly determined, and the other value (volume or mass) being indirectly determined via an integrated conversion occurring (e.g., according to a conversion program running in an associated processor, etc.).

In another present aspect, the type of aircraft fueling adapter flow meter 38 incorporated into the aircraft fuel adapter 30 can be a device that measures a flow that is delivered past the flow meter; with the flow meter configured to assess and otherwise accurately and precisely measure both the flow in volumetric units and in mass units, directly, within a single flow meter.

In a further present aspect, more than one aircraft fueling adapter flow meter 38 can be incorporated into the aircraft fuel adapter 30, and out of the plurality of aircraft fueling adapter flowmeters incorporated into the aircraft fuel adapter, one can be a device that measures a mass flow that is delivered past the (e.g., first) aircraft fueling adapter flow meter in mass units, and another incorporated aircraft fueling adapter flow meter 38 (incorporated into the aircraft fuel adapter 30) can be a device that measures a volume flow that is delivered past the (e.g., second) aircraft fueling adapter flow meter 38; with the second aircraft fueling adapter flow meter configured to assess and otherwise accurately and precisely measure the volume fuel flow in volume units.

Present aspects are therefore directed to increasing the accuracy and certainty of a fuel flow directed into an aircraft from a fuel source by providing an additional measuring device to the aircraft fueling protocol, with the additional measuring device in the form of an aircraft fueling adapter flow meter that is, for the first time, incorporated into the aircraft fueling adapter. The incorporation of the present aircraft fueling adapter flow meter into the aircraft fueling adapter can be accomplished by a retrofit of the adapter to include the aircraft fueling adapter flow meter. In another aspect, a new aircraft fuel adapter that incorporates the aircraft fueling adapter flow meter can be fitted and otherwise fixedly attached to an aircraft fuel line terminus at, for example, an aircraft structure that can be in the form of, for example an aircraft wing comprising the aircraft wing fuel panel, and can replace the typical aircraft fueling adapter.

According to present aspects, the flow meter 38 incorporated into the aircraft fueling adapter is configured to send a signal to at least one of a controller, a processor, a readout for the purpose of displaying a value at a readout that can be at least one of an independent flow value in volume or mass units.

FIG. 5 is a box diagram of a present system 50 for refueling an aircraft, with system 50 comprising an aircraft 10 that further comprises an aircraft fueling adapter 30 that incorporates, integrally, an aircraft fueling adapter flow meter 38. As shown in FIG. 5, and according to present aspects, aircraft fueling adapter flow meter 38 is in communication with or further incorporates a signaling function 38a. The aircraft fueling adapter flow meter 38 is configured to assess a flow traversing and otherwise passing aircraft fueling adapter 30 into an aircraft fuel tank. Aircraft fueling adapter flow meter 38 is configured to send an assessed aircraft fuel flow value in the form of a signal via signaling function (e.g., a signaling transmitter, etc.) 38a to an aircraft fuel adapter flow meter readout 38b that can be located at least at the aircraft fueling adapter, and that can also be located at a location that can be remote from the aircraft fueling adapter such as, for example, an adapter fueling control panel that is, for example located at an aircraft wing fuel panel, or elsewhere within aircraft 10 (as represented by the "dotted line" in FIG. 5).

FIGS. 6, 7, and 8 are perspective views of a wing location of an aircraft comprising the aircraft fuel panel that is shown in an aircraft fuel panel exposed view with the aircraft wing panel door moved to an open position and to an open configuration exposing the aircraft wing fuel panel and the aircraft fueling adapter fixedly attached within the wing assembly of an aircraft.

FIG. 6 is a perspective partial view of an aircraft structure of an aircraft 10 that is in the form of an aircraft wing 14 comprising an aircraft fuel panel 14a further comprising aircraft fuel panel door 14b oriented in an "open" position to reveal the aircraft fuel panel 14a. As shown in FIG. 6, aircraft fueling adapter 30 (comprising an incorporated aircraft fueling adapter flow meter 38) is fixedly attached at the terminus of an aircraft fueling line leading into an aircraft fuel tank (not shown in FIG. 6). That is, as shown in FIG. 6, the aircraft fueling adapter remains as a fixed feature of aircraft wing 14 of aircraft 10, and is located within and accessed at the aircraft wing fuel panel 14a (referred to equivalently herein as "aircraft fuel panel 14a") when the aircraft wing fuel panel 14a is in an exposed configuration when the aircraft fuel panel door 14b is opened for fueling/refueling the aircraft 10. FIG. 6 further shows an aircraft fueling adapter flow meter electrical connection 37 that can be configured to deliver power to the adapter flow meter 38, and that can be further configured to deliver an aircraft fueling adapter flow meter signal conveying a flow meter value to aircraft fueling adapter flow meter (signal) readout 38b that can be housed, as shown in FIG. 6, in aircraft fueling control panel 39.

FIGS. 7 and 8 are perspective partial views of an aircraft structure of an aircraft 10 that is in the form of an aircraft wing 14 comprising an aircraft fuel panel 14a further comprising aircraft fuel panel door 14b that, as shown in FIGS. 7, 8, is oriented in an "open" position to reveal the aircraft wing fuel panel 14a. The enumerated elements illustrated in FIG. 6 are presented again in FIG. 7, with the addition of a second aircraft fueling adapter 30, with each fueling adapter 30 comprising an integrated aircraft fueling adapter flow meter 38. FIG. 8 illustrates (in "dotted line") an operator 40 that can be, for example, a ground crew, in position taking a fueling/refueling reading from the aircraft fueling adapter flow meter readout 38b that can display a fuel quantity value in mass units. As shown in FIG. 8, the operator 40 can compare the aircraft fueling adapter flow meter readout mass value to an aircraft fuel quantity gauge readout 14c from a separate flow meter in communication with the aircraft fuel tank, with the aircraft fuel quantity gauge readout 14c also displaying a fuel quantity value in mass units.

As explained herein, to accurately and precisely confirm a delivered amount of fuel to an aircraft, according to present aspects, protocols are afforded to ground operations and personnel that provide an additional and independent third fuel quantity value to compare against the typical two values that previously existed: 1) the fuel truck reading (in volume units); and 2) the aircraft fuel quantity gauge (in mass units).

According to present aspects, the additional, independent "third" value can also provide a volume value in volume units that can be transmitted to the fueling source (fuel tank truck or other fuel depot or ground fuel tank installation, etc.), such that the volume reading of fuel dispensed from the fuel source into the aircraft tank that is captured in volume units can be immediately compared to a volume reading taken by the aircraft fueling adapter flow meter, with the aircraft fueling adapter flow meter volume reading transmitted to a readout accessible to, for example, ground crew personnel. That is the present aircraft fueling adapters that comprise the integrated aircraft fueling adapter flow meter can provide confirmatory fueling information useful to compare either or both of fuel volume values in volume units and/or fuel mass values in mass units to be compared with the pertinent fueling values typically taken, without having to perform mathematical conversions or mathematical calculations (e.g., obviating the separate manual performance of a mathematical conversion or mathematical calculation, etc.). The fueling value(s) assessed by the present third independent fueling "gauge" or "device" in the form of the integrated aircraft fueling adapter flow meter of the present aircraft fueling adapters, provide an independently assessed and displayed volume reading, an independently assessed and displayed mass reading, or both, that can be compared with the fuel source displayed reading/value (volume units) and/or compared with the aircraft fuel quantity gauge reading/value (mass units).

The present aircraft fueling adapter flow meter that is incorporated into the present aircraft fueling adapter can comprise or be in communication with the processors, signal generators, signal transmitters, etc., that can be in communication with dedicated signal receivers at dedicated readouts, and can include processing hardware, software, etc., to facilitate wireless communication (e.g., transmission and receiving) of fueling values including, for example, via the use of Bluetooth, internet-of-things, etc., and that can be configured to deliver fueling values to locations on the aircraft, and to aircraft instrumentation at the fueling source and to fueling source instrumentation, as well as delivering fueling values to a remote location away from the aircraft, for example, to devices that can be remote hand-held devices of ground personnel as well as to a memory that can be a cloud-based memory, such as, for example, for storing fueling information regarding fueling histories, with such memory being an accessible memory, etc.

FIGS. 9, 10, 11, 12, and 13 are flowcharts illustrating methods, according to present aspects. As shown in FIG. 9, present aspects are directed to a method 100 for confirming an accurate delivery of an amount of fuel delivered from a fuel supply into an aircraft fuel tank, with the method including engaging 102 an aircraft fueling adapter with a fuel supply assembly. The aircraft fueling adapter is fixedly engaged with an aircraft structure, that can be, for example, an aircraft wing comprising an aircraft fuel tank, and with the aircraft structure comprising an aircraft fuel inlet at the aircraft fueling adapter. As described herein, the aircraft fueling adapter includes an aircraft fueling adapter body, with the aircraft fueling adapter body further including an aircraft fueling adapter exterior and an aircraft fueling adapter body interior. The aircraft fueling adapter interior includes an aircraft fueling adapter interior wall and an aircraft fueling adapter interior pathway, with the aircraft fueling adapter interior pathway substantially defined by the aircraft fueling adapter interior wall. The aircraft fueling adapter further includes an aircraft fueling adapter interior pathway inlet, an aircraft fueling adapter interior pathway outlet, and an aircraft fueling adapter flow meter, with the aircraft fueling adapter flow meter in communication with the aircraft fueling adapter interior pathway, and with the aircraft fueling adapter flow meter configured to determine an amount of fuel flow amount passing the aircraft fueling adapter mass flow meter, said amount of fuel flow traversing a path from a fuel supply to the aircraft fueling adapter and into an aircraft fuel tank. The method 100 further comprises directing 104 a flow of fuel from the fuel supply to the aircraft fueling adapter, directing 106 a fuel flow from the aircraft fueling adapter into an aircraft fuel tank, and determining 108 via the aircraft fueling adapter flow meter an amount of fuel delivered from the fuel supply into the aircraft fuel tank through the aircraft fueling adapter. A present method further includes determining a first determined fuel value to confirm the accurate delivery of the amount of fuel flow fuel delivered from the fuel supply into the aircraft fuel tank.

Another present aspect is directed to method 200 for confirming an accurate delivery of an amount of fuel delivered from a fuel supply into an aircraft fuel tank, with the method including providing 202 a fuel supply, and providing 204 an aircraft fuel tank. Method 200 further comprises providing 206 an aircraft fueling adapter that can be an aircraft fuel adapter fixedly attached to an aircraft structure with the aircraft fuel adapter incorporating the flow meter as presently described herein, and delivering 208 a fuel flow from the fuel supply to the aircraft fuel tank via the aircraft fuel adapter. Method 200 further comprises measuring 210 a first determined fuel flow value that is determined at the aircraft fueling adapter. The first determined fuel flow can be a mass flow value in mass units when the adapter flow meter incorporates a mass flow meter, and the first flow value can further be a volumetric value delivered in volume units, with the adapter flow meter configured to deliver both mass unit values and volume unit values.

Another present aspect is directed to a method 300 shown in FIG. 11 that incorporates the steps outlined in method 200 (as shown in FIG. 10), and further includes measuring 302 a second determined fuel flow value that is determined at, at least one of the fuel source (in volume units) and at the aircraft fuel quantity gauge (in mass units). According to present aspects, method 300 contemplates (at step 210) that the first determined fuel flow value determined/measured at the adapter flow meter will be a volume-based quantity value (volume units) when the second determined value determined at the fuel truck is a volume-based quantity value (volume units). In addition, according to present aspects, method 300 contemplates (at step 210) that the first determined fuel flow value determined/measured at the adapter flow meter will be a mass-based quantity value (mass units) when the second determined value is determined at the aircraft fuel quantity gauge and is a mass-based quantity value (mass units).

As shown in FIG. 12, another present aspect is directed to a method 400 that incorporates the steps outlined in method 300 (as shown in FIG. 11), and further includes the step 402 in method 400 including comparing 402 the second determined fuel flow value that is determined at, at least one of the fuel source (in volume units) and at the aircraft fuel quantity gauge (in mass units) with the first determined fuel flow value. According to present aspects, method 400 contemplates (at step 210) that the first determined fuel flow value determined/measured at the adapter flow meter will be a volume-based quantity value (volume units) when the second determined value determined at the fuel truck is a volume-based quantity value (volume units). In addition, according to present aspects, method 400 contemplates (at step 210) that the first determined fuel flow value determined/measured at the adapter flow meter will be a mass-based quantity value (mass units) when the second determined value is determined at the aircraft fuel quantity gauge and is a mass-based quantity value (mass units). In step 402, the first and second determined values (both first and second values being volume values, or both first and second values being mass values) are compared to another to determine a discrepancy between the first determined fuel value and the second determined fuel value (or to confirm agreement between the first and second determined values).

As shown in FIG. 13, another present method if directed to a method 500 for making an aircraft fueling adapter, with the method 500 comprising providing 502 an aircraft fueling adapter including a fueling adapter body, with the aircraft fueling adapter body further including an aircraft fueling adapter exterior and an aircraft fueling adapter body interior, with the aircraft fueling adapter interior including an aircraft fueling adapter interior wall and an aircraft fueling adapter interior pathway, and with the aircraft fueling adapter interior pathway substantially defined by the aircraft fueling adapter interior wall. The method 500 further includes incorporating 504 a flow meter into the aircraft fueling adapter, with the flow meter in communication with the aircraft fueling adapter interior pathway, with the flow meter configured to determine an amount of a fuel flow passing the aircraft flow meter, and with the amount of the fuel flow configured to traverse a path from a fuel supply through the aircraft fueling adapter and into an aircraft fuel tank.

According to a present aspect, in method 500, at step 504 the flow meter can be a mass flow meter, and the flow meter can be a flow meter that measures both volume and mass. In addition, step 504 contemplated incorporating a plurality of flow meters into the aircraft fueling adapter with one flow meter being a mass flow meter, and another flowmeter being a flow meter that measures volume.

The methods 100, 200, 300, 400, 500 outlined in FIGS. 9, 10, 11, 12, and 13 can comprise the apparatuses and systems described herein and shown, for example, in one or more of FIGS. 1, 2, 3, 4, 5, 6, 7, and or 8.

The term "substantially bounded" and/or "substantially defined" as used herein means that a particular physical element is almost completely or is nearly completely surrounded and/or bounded by another stated element, and is almost completely or is nearly completely defined by another stated element.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed:

1. A method for confirming an accurate delivery of an amount of fuel delivered from a fuel supply into an aircraft fuel tank, the method comprising: engaging an aircraft fueling adapter with a fuel supply assembly, said aircraft fueling adapter fixedly engaged with an aircraft structure, said aircraft structure comprising an aircraft fuel inlet, said aircraft fueling adapter comprising: an aircraft fueling adapter body, said aircraft fueling adapter body further comprising an aircraft fueling adapter exterior and an aircraft fueling adapter body interior, said aircraft fueling adapter interior comprising an aircraft fueling adapter interior wall and an aircraft fueling adapter interior pathway, said aircraft fueling adapter interior pathway substantially defined by the aircraft fueling adapter interior wall; an aircraft fueling adapter interior pathway inlet; an aircraft fueling adapter interior pathway outlet; an aircraft fueling adapter flow meter, said aircraft fueling adapter flow meter in communication with the aircraft fueling adapter interior pathway, said aircraft fueling adapter flow meter configured to determine an amount of fuel in a fuel flow delivered from the fuel supply, said fuel flow passing the aircraft fueling adapter flow meter, said amount of the fuel flow traversing a path from the fuel supply to the aircraft fueling adapter and into the aircraft fuel tank; directing a flow of fuel from the fuel supply to the aircraft fueling adapter; directing the fuel flow from the aircraft fueling adapter into the aircraft fuel tank; determining at the aircraft fueling adapter an amount of fuel delivered from the fuel supply into the aircraft fuel tank; and determining a first determined fuel value to confirm the accurate delivery of the amount of fuel flow fuel delivered from the fuel supply into the aircraft fuel tank.

2. The method of claim 1 further comprising: determining a second determined fuel value measured at the fuel supply for the amount of fuel delivered from the fuel supply to the aircraft fuel tank measured at the fuel supply based on a fuel volume delivered from the fuel supply measured at the fuel supply; and comparing the first determined fuel value to the second determined fuel value to determine a discrepancy between the first determined fuel value and the second determined fuel value.

3. The method of claim 2, wherein the second determined fuel value is a converted mass value calculated at the fuel supply.

4. The method of claim 2, wherein the second determined fuel value is a volumetric value calculated at the fuel supply.

5. The method of claim 1, wherein the aircraft fueling adapter flow meter is a mass flow meter configured to directly calculate fuel mass delivered to the aircraft fuel tank from the fuel supply, and wherein said first determined fuel value is a mass value.

6. The method of claim 1, wherein the aircraft fueling adapter flow meter is configured to measure fuel flow volume delivered to the aircraft fuel tank from the fuel supply, and wherein said first determined fuel value is a volumetric value.

7. The method of claim 1, wherein the aircraft fueling adapter flow meter is further configured to automatically calculate an amount of fuel delivered to the aircraft fuel tank from the fuel supply, and wherein said first determined fuel value is at least one of a mass value and a volumetric value.

8. The method of claim 1, wherein said flow meter is configured to send a flow value signal to a readout.

9. The method of claim 8, wherein the aircraft fueling adapter comprises a readout.

10. A method for fueling an aircraft, the method comprising: providing a fuel supply; providing an aircraft fuel tank in an aircraft, said aircraft fuel tank in communication with an aircraft fuel tank inlet; providing an aircraft fueling adapter fixedly engaged with the aircraft, said aircraft fueling adapter in communication with the aircraft fuel tank inlet, said aircraft fueling adapter further in communication with the fuel supply, said aircraft fueling adapter comprising an aircraft fueling adapter flow meter; delivering a fuel flow from the fuel supply to the aircraft fuel tank; determining a first determined fuel value based on said fuel flow, said fuel flow configured to pass through the aircraft fueling adapter, said first determined fuel value measured at the aircraft fueling adapter by the aircraft fueling adapter flow meter and determining a second determined fuel value measured at the fuel supply based on said fuel flow leaving the fuel supply.

11. The method of claim 10, wherein aircraft fueling adapter flow meter is a mass flow meter configured to calculate fuel mass delivered to the aircraft fuel tank from the fuel supply, and wherein said first determined fuel value is a mass value.

12. The method of claim 10, wherein the second determined fuel value is a converted mass value calculated at the fuel supply.

13. The method of claim 10, wherein the aircraft fueling adapter flow meter is configured to measure fuel flow volume delivered to the aircraft fuel tank from the fuel supply, and wherein said first determined fuel value is a volumetric value.

14. The method of claim 10, wherein the second determined fuel value is a volumetric value measured at the fuel supply.

15. The method of claim 10, wherein the aircraft fueling adapter flow meter is further configured to automatically/directly calculate fuel mass delivered to the aircraft fuel tank from the fuel supply, and wherein said determined fuel value is at least one of a mass value and a volumetric value.

16. The method of claim 10, wherein the second determined fuel value is a mass value calculated manually by converting a fuel volume value delivered from the fuel supply based on a measured fuel volume delivered from the fuel supply.

17. The method of claim 10, further comprising: comparing the first determined fuel value to the second determined fuel value to determine a discrepancy between the first determined fuel value and the second determined fuel value.

18. The method of claim 10, wherein said flow meter is configured to send a flow value signal to a readout.

19. The method of claim 18, wherein the aircraft fueling adapter comprises the readout.

\* \* \* \* \*